United States Patent [19]

Müller

[11] Patent Number: 5,583,163
[45] Date of Patent: Dec. 10, 1996

[54] PHOTOCROSSLINKED POLYMERS

[75] Inventor: Beat Müller, Marly, Switzerland

[73] Assignee: Ciba Geigy Corporation, Tarrytown, N.Y.

[21] Appl. No.: 463,546

[22] Filed: Jun. 5, 1995

Related U.S. Application Data

[62] Division of Ser. No. 286,035, Aug. 4, 1994, Pat. No. 5,508,317.

[30] Foreign Application Priority Data

Aug. 6, 1993 [CH] Switzerland ............... 2350/93

[51] Int. Cl.$^6$ ............... C08F 2/48; C08F 216/38; C08J 7/18; C08J 5/00
[52] U.S. Cl. ............ 522/152; 522/154; 523/106; 523/108; 525/58; 525/59; 525/60; 525/61
[58] Field of Search ................ 522/151, 152, 522/154; 523/106, 108; 525/58, 59, 60, 61

[56] References Cited

U.S. PATENT DOCUMENTS

| | | | |
|---|---|---|---|
| 4,598,122 | 7/1986 | Goldenberg | 525/61 |
| 4,663,410 | 5/1987 | Pinschmidt | 526/263 |
| 4,670,506 | 6/1987 | Goldenberg et al. | 525/59 |
| 4,691,026 | 9/1987 | Pinschmidt, Jr. | 548/531 |
| 4,788,288 | 11/1988 | Pinschmidt, Jr. | 544/212 |
| 4,864,055 | 9/1989 | Pinschmidt | 560/160 |
| 5,326,669 | 7/1994 | Curtis | 525/59 |
| 5,332,651 | 7/1994 | Dickinson et al. | 522/154 |
| 5,360,864 | 11/1994 | Curtis | 525/58 |

FOREIGN PATENT DOCUMENTS

| | | | |
|---|---|---|---|
| 216074 | 4/1987 | European Pat. Off. | C08F 261/04 |
| 321403 | 6/1989 | European Pat. Off. | G02B 1/04 |
| 050124608 | 10/1975 | Japan . | |
| 161812 | 7/1987 | Japan . | |
| 81101 | 4/1988 | Japan . | |
| 12109742 | 4/1990 | Japan . | |
| 0215269 | 9/1991 | Japan | 523/106 |
| 0007302 | 1/1992 | Japan | 525/59 |
| 2263699 | 8/1993 | United Kingdom | C08F 8/30 |

OTHER PUBLICATIONS

Optical or Electron Radiation Crosslinking Type Resin Composition, vol. 11 No. 398(C–466)(2345) Dec. 25, 1987.
Photosensitive Resin, vol. 12 No. 312(C–523)(3159) Aug. 24, 1988.

*Primary Examiner*—Peter A. Szekely
*Attorney, Agent, or Firm*—Edward McC. Roberts; R. Scott Meece; Michael U. Lee

[57] ABSTRACT

The invention relates to a novel process for the manufacture of mouldings, especially contact lenses, in which a soluble prepolymer comprising crosslinkable groups is cross-linked in solution, and also to mouldings, especially contact lenses, obtainable in accordance with that process. The present invention relates also to novel prepolymers that can be used in the process according to the invention, especially derivatives of a polyvinyl alcohol having a molecular weight of at least about 2000 that, based on the number of hydroxy groups of the polyvinyl alcohol, comprise from approximately 0.5 to approximately 80% of units of formula I $$\begin{array}{c} \phantom{xx}CH_2\phantom{xxx}CH_2\\ CH\phantom{xxxx}CH\\ |\phantom{xxxxxx}|\\ O\phantom{xxxx}O\\ \phantom{xx}CH\\ |\phantom{xx}R^1\\ R-N\\ \phantom{xxxx}R^2 \end{array} \quad (I)$$

wherein

R is lower alkylene having up to 8 carbon atoms, $R^1$ is hydrogen or lower alkyl and $R^2$ is an olefinically unsaturated, electron-attracting, copolymerisable radical preferably having up to 25 carbon atoms, to crosslinked polymers, either homo- or co-polymers of those novel prepolymers, to processes for the preparation of the novel prepolymers and the homo- and co-polymers obtainable therefrom, to mouldings made from the said homo- or co-polymers, especially contact lenses made from those homo- or co-polymers, and to processes for the manufacture of contact lenses using the said homo- or co-polymers.

21 Claims, No Drawings

PHOTOCROSSLINKED POLYMERS

Priority is claimed under 35 U.S.C. 119 to Swiss Application No. 02 350/93-0 filed on Aug. 6, 1993. This application is a divisional application under 35 U.S.C. 120 of U.S. application Ser. No. 08/286,035 filed Aug. 4, 1994, now U.S. Pat. No. 5,508,317.

PHOTOCROSSLINKED POLYMERS

The invention relates to a novel process for the manufacture of mouldings, especially contact lenses, in which a soluble prepolymer comprising crosslinkable groups is cross-linked in solution, and also to mouldings, especially contact lenses, obtainable in accordance with that process.

The present invention relates also to novel prepolymers that can be used in the process according to the invention, especially to those based on polyvinyl alcohol that comprise cyclic acetal groups and crosslinkable groups, to crosslinked polymers, either homo- or co-polymers of those novel prepolymers, to processes for the preparation of the novel pre-polymers and the homo- and co-polymers obtainable therefrom, to mouldings made from the said homo- or co-polymers, especially contact lenses made from those homo- or co-polymers, and to processes for the manufacture of contact lenses using the said homo- or co-polymers.

Contact lenses based on polyvinyl alcohol are already known. For example, contact lenses comprising polyvinyl alcohol that has (meth)acryloyl groups bonded by way of urethane groups are disclosed, for example, in EP 216 074. Contact lenses made from polyvinyl alcohol crosslinked with polyepoxides are described in EP 189 375.

Also already known are some special acetals that comprise crosslinkable groups. Reference is made in that connection, for example, to EP 201 693, EP 215 245 and EP 211 432. EP 201 693 describes, inter alia, acetals of unbranched aldehydes having from 2 to 11 carbon atoms that carry a terminal amino group that has been substituted by a $C_3$–$C_{24}$-olefinically unsaturated organic radical. That organic radical has a functionality that removes electrons from the nitrogen atom, and also the olefinically unsaturated functionality is polymerisable. Also claimed in EP 201 693 are reaction products of the above-characterised acetals with a 1,2-diol, a 1,3-diol, a polyvinyl alcohol or a cellulose. Products of that kind are not, however, expressly described.

Inasmuch as one of the acetals according to EP 201 693 is mentioned at all in connection with, for example, polyvinyl alcohol, as is the case, inter alia, in Example 17 of that Patent Application, then the acetal polymerisable by way of its olefinic group is first copolymerised, for example, with vinyl acetate. The copolymer so obtained is then reacted with polyvinyl alcohol, and an emulsion with a pH of 5.43 and a viscosity of 11640 cps which contains 37% solids is obtained.

In contrast, the present invention is directed, inter alia, to prepolymers that comprise a 1,3-diol basic structure in which a certain percentage of the 1,3-diol units have been modified to a 1,3-dioxane having in the 2-position a radical that is polymerisable but not polymerised. The polymerisable radical is especially an aminoalkyl radical having a polymerisable group bonded to the nitrogen atom. The present invention relates also to crosslinked homo- or co-polymers of the said prepolymers, to processes for the preparation of the novel prepolymers, to the homo- and co-polymers obtainable therefrom, to mouldings made from the said homo- or co-polymers, especially to contact lenses made from those homo- or co-polymers, and to processes for the manufacture of contact lenses using the said homo- or co-polymers.

The prepolymer according to the invention is preferably a derivative of a polyvinyl alcohol having a molecular weight of at least about 2000 that, based on the number of hydroxy groups of the polyvinyl alcohol, comprises from approximately 0.5 to approximately 80% of units of formula I

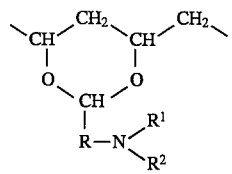 (I)

wherein

R is lower alkylene having up to 8 carbon atoms, $R^1$ is hydrogen or lower alkyl and $R^2$ is an olefinically unsaturated, electron-attracting, copolymerisable radical preferably having up to 25 carbon atoms.

$R^2$ is, for example, an olefinically unsaturated acyl radical of formula $R^3$—CO—, in which $R^3$ is an olefinically unsaturated copolymerisable radical having from 2 to 24 carbon atoms, preferably from 2 to 8 carbon atoms, especially preferably from 2 to 4 carbon atoms. In another embodiment, the radical $R^2$ is a radical of formula II $$-CO-NH-(R^4-NH-CO-O)_q-R^5-O-CO-R^3 \quad (II)$$

wherein q is zero or one and $R^4$ and $R^5$ are each independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylenearylene having from 13 to 16 carbon atoms, and $R^3$ is as defined above.

The prepolymer according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula III

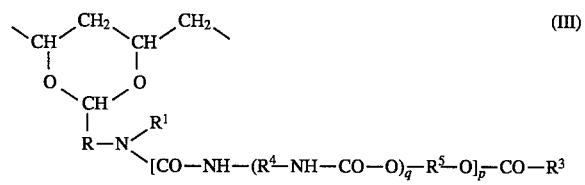 (III)

wherein

R is lower alkylene, $R^1$ is hydrogen or lower alkyl, p is zero or one, q is zero or one, $R^3$ is an olefinically unsaturated copolymerisable radical having from 2 to 8 carbon atoms and $R^4$ and $R^5$ are each independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylenearylene having from 13 to 16 carbon atoms.

Lower alkylene R preferably has up to 8 carbon atoms and may be straight-chained or branched. Suitable examples include octylene, hexylene, pentylene, butylene, propylene, ethylene, methylene, 2-propylene, 2-butylene and 3-pentylene. Preferably lower alkylene R has up to 6 and especially preferably up to 4 carbon atoms. The meanings methylene and butylene are especially preferred.

$R^1$ is preferably hydrogen or lower alkyl having up to seven, especially up to four, carbon atoms, especially hydrogen.

Lower alkylene $R^4$ or $R^5$ preferably has from 2 to 6 carbon atoms and is especially straight-chained. Suitable examples include propylene, butylene, hexylene, dimethylethylene and, especially preferably, ethylene.

Arylene $R^4$ or $R^5$ is preferably phenylene that is unsubstituted or is substituted by lower alkyl or lower alkoxy, especially 1,3-phenylene or 1,4-phenylene or methyl-1,4-phenylene.

A saturated divalent cycloaliphatic group $R^4$ or $R^5$ is preferably cyclohexylene or cyclohexylene-lower alkylene, for example cyclohexylenemethylene, that is unsubstituted or is substituted by one or more methyl groups, such as, for example, trimethylcyclohexylenemethylene, for example the divalent isophorone radical.

The arylene unit of alkylenearylene or arylenealkylene $R^4$ or $R^5$ is preferably phenylene, unsubstituted or substituted by lower alkyl or lower alkoxy, and the alkylene unit thereof is preferably lower alkylene, such as methylene or ethylene, especially methylene. Such radicals $R^4$ or $R^5$ are therefore preferably phenylenemethylene or methylenephenylene.

Arylenealkylenearylene $R^4$ or $R^5$ is preferably phenylene-lower alkylene-phenylene having up to 4 carbon atoms in the alkylene unit, for example phenyleneethylenephenylene.

The radicals $R^4$ and $R^5$ are each independently preferably lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene.

Within the scope of this invention, the term "lower" used in connection with radicals and compounds denotes radicals or compounds having up to 7 carbon atoms, preferably up to 4 carbon atoms, unless defined otherwise.

Lower alkyl has especially up to 7 carbon atoms, preferably up to 4 carbon atoms, and is, for example, methyl, ethyl, propyl, butyl or tert-butyl.

Lower alkoxy has especially up to 7 carbon atoms, preferably up to 4 carbon atoms, and is, for example, methoxy, ethoxy, propoxy, butoxy or tert-butoxy.

The olefinically unsaturated copolymerisable radical $R^3$ having from 2 to 24 carbon atoms is preferably alkenyl having from 2 to 24 carbon atoms, especially alkenyl having from 2 to 8 carbon atoms and especially preferably alkenyl having from 2 to 4 carbon atoms, for example ethenyl, 2-propenyl, 3-propenyl, 2-butenyl, hexenyl, octenyl or dodecenyl. The meanings ethenyl and 2-propenyl are preferred, so that the group —CO—$R^3$ is the acyl radical of acrylic or methacrylic acid.

The divalent group -$R^4$—NH—CO—O— is present when q is one and absent when q is zero. Prepolymers in which q is zero are preferred.

The divalent group —CO—NH—($R^4$—NH—CO—O)$_q$-$R^5$—O— is present when p is one and absent when p is zero. Prepolymers in which p is zero are preferred.

In prepolymers in which p is one the index q is preferably zero. Prepolymers in which p is one, the index q is zero and $R^5$ is lower alkylene are especially preferred.

A preferred prepolymer according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is zero and $R^3$ is alkenyl having from 2 to 8 carbon atoms.

A further preferred prepolymer according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is one, q is zero, $R^5$ is lower alkylene having from 2 to 6 carbon atoms and $R^3$ is alkenyl having from 2 to 8 carbon atoms.

A further preferred prepolymer according to the invention is therefore especially a derivative of a polyvinyl alcohol having a molecular weight of at least about 2000 that, based on the number of hydroxy groups of the polyvinyl alcohol, comprises from approximately 0.5 to approximately 80% of units of formula III in which R is lower alkylene having up to 6 carbon atoms, p is one, q is one, $R^4$ is lower alkylene having from 2 to 6 carbon atoms, phenylene, unsubstituted or substituted by lower alkyl, cyclohexylene or cyclohexylene-lower alkylene, unsubstituted or substituted by loweralkyl, phenylen-lower alkylene, lower alkylene-phenylene or phenylene-lower alkylene-phenylene, $R^5$ is lower alkylene having from 2 to 6 carbon atoms and $R^3$ is alkenyl having from 2 to 8 carbon atoms.

The prepolymers according to the invention are preferably derivatives of polyvinyl alcohol having a molecular weight of at least about 2000 that, based on the number of hydroxy groups of the polyvinyl alcohol, comprises from approximately 0.5 to approximately 80%, especially approximately from 1 to 50%, preferably approximately from 1 to 25%, preferably approximately from 2 to 15% and especially preferably approximately from 3 to 10%, of units of formula III. Prepolymers according to the invention which are provided for the manufacture of contact lenses comprise, based on the number of hydroxy groups of the polyvinyl alcohol, especially from approximately 0.5 to approximately 25%, especially approximately from 1 to 15% and especially preferably approximately from 2 to 12%, of units of formula III.

Polyvinyl alcohols that can be derivatised in accordance with the invention preferably have a molecular weight of at least 10 000. As an upper limit the polyvinyl alcohols may have a molecular weight of up to 1 000 000. Preferably, the polyvinyl alcohols have a molecular weight of up to 300 000, especially up to approximately 100 000 and especially preferably up to approximately 50 000.

Polyvinyl alcohols suitable in accordance with the invention usually have a poly(2-hydroxy)ethylene structure. The polyvinyl alcohols derivatised in accordance with the invention may, however, also comprise hydroxy groups in the form of 1,2-glycols, such as copolymer units of 1,2-dihydroxyethylene, as may be obtained, for example, by the alkaline hydrolysis of vinyl acetate/vinylene carbonate copolymers.

In addition, the polyvinyl alcohols derivatised in accordance with the invention may also comprise small proportions, for example up to 20%, preferably up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar customarily used comonomers.

Commercially available polyvinyl alcohols may be used, such as, for example, Vinol® 107 produced by Air Products (MW=22 000 to 31 000, 98–98.8% hydrolysed), Polysciences 4397 (MW=25 000, 98.5% hydrolysed), BF 14 produced by Chan Chun, Elvanol® 90–50 produced by DuPont, UF-120 produced by Unitika, Moviol® 4–88, 10–98 and 20–98 produced by Hoechst. Other manufacturers are, for example, Nippon Gohsei (Gohsenol®), Monsanto (Gelvatol®), Wacker (Polyviol®) and the Japanese manufacturers Kuraray, Denki and Shin-Etsu The molecular weights referenced herein are weight average weights, Mw, determined by gel permeation chromatography, unless otherwise specified.

As already mentioned, it is also possible to use copolymers of hydrolysed vinyl acetate, which are obtainable, for example, in the form of hydrolysed ethylene/vinyl acetate (EVA), or vinyl chloride/vinyl acetate, N-vinylpyrrolidone/vinyl acetate and maleic acid anhydride/vinyl acetate.

Polyvinyl alcohol is usually prepared by hydrolysis of the corresponding homopolymeric polyvinyl acetate. In a preferred embodiment, the polyvinyl alcohol derivatised in accordance with the invention comprises less than 50% of polyvinyl acetate units, especially less than 20% of polyvinyl acetate units. Preferred amounts of residual acetate units in the polyvinyl alcohol derivatised in accordance with the invention, based on the sum of vinyl alcohol units and acetate units, are approximately from 3 to 20%, preferably approximately from 5 to 16% and especially approximately from 10 to 14%.

The compounds comprising units of formula III may be prepared in a manner known per se. For example, a polyvinyl alcohol having a molecular weight of least about 2000 that comprises units of formula IV

$$-CH(OH)-CH_2- \qquad (IV)$$

may be reacted with approximately from 0.5 to 80%, based on the number of hydroxy groups of the compound of formula IV, of a compound of formula (V)

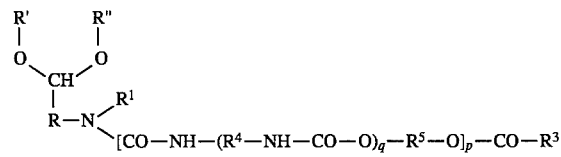

in which

R' and R" are each independently hydrogen, lower alkyl or lower alkanoyl, such as acetyl or propionyl, and the other variables are as defined for formula III, especially in an acidic medium.

Alternatively, a polyvinyl alcohol having a molecular weight of at least about 2000 that comprises units of formula IV may be reacted with a compound of formula VI

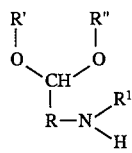

in which the variables are as defined for the compound of formula V, especially under acidic conditions, and the cyclic acetal obtainable in that manner may then be reacted with a compound of formula VII

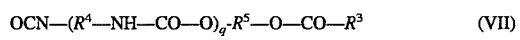

in which the variables are as defined for the compound of formula V.

Alternatively, the product obtainable as described above from a compound of formula IV and a compound of formula VI may be reacted with a compound of formula (VII)

in which $R^3$ is, for example, alkenyl having from 2 to 8 carbon atoms and X is a reactive group, for example etherified or esterified hydroxy, for example halogen, especially chlorine.

Compounds of formula V in which p is zero are known, for example, from EP 201 693. Compounds of formula VI are also described therein. Compounds of formula VII are known per se, or can be prepared in a manner known per se. An example of a compound of formula VII in which q is zero is isocyanatoethyl methacrylate. An example of a compound of formula VII in which q is one is the reaction product of isophorone diisocyanate with 0.5 equivalent of hydroxyethyl methacrylate. Compounds of formula VIII are known per se; a typical representative is methacryloyl chloride. Compounds of formula V in which p and/or q are 1 can be prepared in a manner known per se from the above-mentioned compounds, for example by reaction of a compound of formula VI with isocyanatoethyl methacrylate or by reaction of a compound of formula VI with isophorone diisocyanate which has previously been terminated with 0.5 equivalent of hydroxyethyl methacrylate.

Surprisingly the prepolymers of formulae I and III are extraordinarily stable. This is unexpected for the person skilled in the art because, for example, higher-functional acrylates usually have to be stabilised. If such compounds are not stabilised then rapid polymerisation usually occurs. Spontaneous crosslinking by homopolymerisation does not occur, however, with the prepolymers of the invention. The prepolymers of formulae I and III can furthermore be purified in a manner known per se, for example by precipitation with acetone, dialysis or ultrafiltration, ultrafiltration being especially preferred. By means of that purification process the prepolymers of formulae I and III can be obtained in extremely pure form, for example in the form of concentrated aqueous solutions that are free, or at least substantially free, from reaction products, such as salts, and from starting materials, such as, for example, compounds of formula V or other non-polymeric constituents.

The preferred purification process for the prepolymers of the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the sodium chloride content of the solution, which can be determined simply in known manner.

The prepolymers of formulae I and III according to the invention are on the other hand crosslinkable in an extremely effective and controlled manner, especially by photocrosslinking.

The present invention is therefore also directed to a polymer that can be obtained by photocrosslinking a prepolymer comprising units of formula I or III in the absence or presence of an additional vinylic comonomer. Those polymers are water-insoluble.

In the case of photocrosslinking, it is appropriate to add a photoinitiator which can initiate radical crosslinking. Examples thereof are familiar to the person skilled in the art and suitable photoinitiators that may be mentioned specifically are benzoin methyl ether, 1-hydroxycyclohexylphenyl ketone, Darocure 1173 or Irgacure types. The crosslinking can then be triggered by actinic radiation, such as, for example, UV light, or ionising radiation, such as, for example, gamma radiation or X-radiation.

The photopolymerisation is suitably carried out in a solvent. A suitable solvent is in principle any solvent that dissolves polyvinyl alcohol and the vinylic comonomers optionally used in addition, for example water, alcohols, such as lower alkanols, for example ethanol or methanol, also carboxylic acid amides, such as dimethylformamide, or dimethyl sulfoxide, and also a mixture of suitable solvents, such as, for example, a mixture of water with an alcohol, such as, for example, a water/ethanol or a water/methanol mixture.

The photocrosslinking is carried out preferably directly from an aqueous solution of the prepolymers according to the invention, which can be obtained by the preferred purification step, ultrafiltration, where appropriate after the addition of an additional vinylic comonomer. For example, an approximately 15 to 40% aqueous solution can be photocrosslinked.

The process for the preparation of the polymers of the invention may comprise, for example, photocrosslinking a prepolymer comprising units of formula I or III, especially in substantially pure form, that is to say, for example, after single or repeated ultra-filtration, preferably in solution, especially in aqueous solution, in the absence or presence of an additional vinylic comonomer.

The vinylic comonomer which, in accordance with the invention, may be used in addition in the photocrosslinking, may be hydrophilic or hydrophobic, or a mixture of a hydrophobic and a hydrophilic vinylic monomer. Suitable vinylic monomers include especially those customarily used in the manufacture of contact lenses. A hydrophilic vinylic monomer denotes a monomer that typically yields as homopolymer a polymer that is water-soluble or can absorb at least 10% by weight of water. Analogously, a hydrophobic vinylic monomer denotes a monomer that typically yields as homopolymer a polymer that is water-insoluble and can absorb less than 10% by weight of water.

Generally, approximately from 0.01 to 80 units of a typical vinylic comonomer react per unit of formula I or III.

If a vinylic comonomer is used, the crosslinked polymers according to the invention preferably comprise approximately from 1 to 15%, especially preferably approximately from 3 to 8%, of units of formula I or III, based on the number of hydroxy groups of the polyvinyl alcohol, which are reacted with approximately from 0.1 to 80 units of the vinylic monomer.

The proportion of the vinylic comonomers, if used, is preferably from 0.5 to 80 units per unit of formula I, especially from 1 to 30 units per unit of formula I, and especially preferably from 5 to 20 units per unit of formula I.

It is also preferable to use a hydrophobic vinylic comonomer or a mixture of a hydrophobic vinylic comonomer with a hydrophilic vinylic comonomer, the mixture comprising at least 50% by weight of a hydrophobic vinylic comonomer. In that manner the mechanical properties of the polymer can be improved without the water content falling substantially.

In principle, however, both conventional hydrophobic vinylic comonomers and conventional hydrophilic vinylic comonomers are suitable for the copolymerisation with polyvinyl alcohol comprising groups of formula I.

Suitable hydrophobic vinylic comonomers include, without the list being exhaustive, $C_1$–$C_{18}$alkyl acrylates and methacrylates, $C_3$–$C_{18}$alkyl acrylamides and methacrylamides, acrylonitrile, methacrylonitrile, vinyl $C_1$–$C_{18}$alkanoates, $C_2$–$C_{18}$alkenes, $C_2$–$C_{18}$haloalkenes, styrene, $C_1$–$C_6$alkylstyrene, vinyl alkyl ethers, in which the alkyl moiety contains from 1 to 6 carbon atoms, $C_2$–$C_{10}$perfluoroalkyl acrylates and methacrylates or correspondingly partially fluorinated acrylates and methacrylates, $C_3$–$C_{12}$perfluoroalkyl-ethyl-thiocarbonylaminoethyl acrylates and methacrylates, acryloxy- and methacryloxy-alkylsiloxanes, N-vinylcarbazole, $C_1$–$C_{12}$alkyl esters of maleic acid, fumaric acid, itaconic acid, mesaconic acid and the like. $C_1$–$C_4$alkyl esters of vinylically unsaturated carboxylic acids having from 3 to 5 carbon atoms or vinyl esters of carboxylic acids having up to 5 carbon atoms, for example, are preferred.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris-trimethylsilyloxy-silyl-propyl methacrylate, 3-methacryloxypropylpentamethyldisiloxane and bis(methacryloxypropyl)tetramethylctisiloxane.

Suitable hydrophilic vinylic comonomers include, without the list being exhaustive, hydroxy-substituted lower alkyl acrylates and methacrylates, acrylamide, methacrylamide, lower alkyl acrylamides and methacrylamides, ethoxylated acrylates and methacrylates, hydroxy-substituted lower alkyl acrylamides and methacrylamides, hydroxy-substituted lower alkyl vinyl ethers, sodium ethylenesulfonate, sodium styrenesulfonate, 2-acryl-amido-2-methylpropanesulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-lower alkylamino- or di-lower alkylamino-lower alkyl acrylates and methacrylates, allyl alcohol and the like. Hydroxy-substituted $C_2$–$C_4$-alkyl(meth)acrylates, five- to seven-membered N-vinyl lactams, N,N-di-$C_1$–$C_4$alkyl(meth)acrylamides and vinylically unsaturated carboxylic acids having a total of from 3 to 5 carbon atoms, for example, are preferred.

Examples of suitable hydrophilic vinylic comonomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)-acrylamide, and the like.

Preferred hydrophobic vinylic comonomers are methyl methacrylate and vinyl acetate.

Preferred hydrophilic vinylic comonomers are 2-hydroxyethyl methacrylate, N-vinylpyrrolidone and acrylamide.

The prepolymers according to the invention can be processed in a manner known per se into mouldings, especially contact lenses, for example by carrying out the photocrosslinking of the prepolymers according to the invention in a suitable contact lens mould. The invention is therefore also directed to mouldings that consist substantially of a polymer according to the invention. Further examples of mouldings according to the invention, besides contact lenses, are biomedical or especially ophthalmic mouldings, for example intraocular lenses, eye bandages, mouldings that can be used in surgery, such as heart valves, artificial arteries or the like, and also films or membranes, for example membranes for diffusion control, photostructurizable films for information storage, or photoresist materials, for example membranes or mouldings for etch resist or screen printing resist.

A special embodiment of the invention is directed to contact lenses that comprise a polymer according to the invention or consist substantially or wholly of a polymer according to the invention. Such contact lenses have a wide range of unusual and extremely advantageous properties, which include, for example, their excellent compatibility with the human cornea, which is based on a balanced relationship of water content, oxygen permeability and mechanical properties. The contact lenses according to the invention furthermore exhibit a high degree of dimensional stability. No changes in shape are detected even after autoclaving at, for example, about 120° C.

Attention may also be drawn to the fact that the contact lenses according to the invention, which means especially those comprising a polymer based on a prepolymer comprising units of formula I, can be produced in a very simple and efficient manner compared with the state of the art. This is as a result of several factors. First, the starting materials can be obtained or produced at a favourable cost. Secondly, there is the advantage that the prepolymers are surprisingly stable, so that they can be subjected to a high degree of purification. It is therefore possible to use for the crosslinking a prepolymer that requires practically no subsequent purification, such as especially a complicated extraction of unpolymerised constituents. Also, the polymerisation can be carried out in aqueous solution, so that a subsequent hydration step is not necessary. Finally, the photopolymerisation occurs within a short period, so that the process for manufacturing the contact lenses according to the invention can be organised to be extremely economical from that point of view also.

All of the advantages mentioned above naturally apply not only to contact lenses but also to other mouldings according to the invention. Taking into account all the various advantageous aspects in the manufacture of the mouldings according to the invention it can be seen that the mouldings according to the invention are especially suitable as mass-produced articles, such as, for example, contact lenses that are worn for a short time and then replaced by new lenses.

The present invention also relates to the manufacture of mouldings according to the invention, especially contact lenses according to the invention. In the following, those processes are illustrated using the example of contact lenses, but the processes can, however, also be used for other mouldings according to the invention.

The contact lenses according to the invention can be manufacture for example, in a manner known per se, for example in a conventional "spin-casting mould", as described, for example, in U.S. Pat No. 3,408,429, or by the so-called Full-Mould process in a static mould, as described, for example, in U.S. Pat. No. 4,347,198.

It has been ascertained in accordance with the invention that the process described above with reference to prepolymers comprising units of formula I can be applied generally. The present invention therefore relates to a novel process for the manufacture of polymeric mouldings, especially contact lenses, in which a water-soluble prepolymer comprising crosslinkable groups is crosslinked in solution, and to mouldings, especially contact lenses, obtainable in accordance with that process. The mouldings obtainable in that manner by crosslinking are water-insoluble but are swellable in water.

In detail, the process for the manufacture of mouldings, especially contact lenses, comprises the following steps:

a) the preparation of a substantially aqueous solution of a water-soluble prepolymer that comprises crosslinkable groups, b) the introduction of the solution obtained into a mould, c) the triggering of the crosslinking, d) opening of the mould such that the moulding can be removed from the mould.

Unless expressly excluded hereinafter, the detailed explanations and preferences disclosed hereinbefore in connection with prepolymers comprising units of formula I, and also the detailed explanations and preferences disclosed in connection with the processes for the production of polymers and mouldings, such as, especially, contact lenses, from those prepolymers, apply also to the process comprising steps a), b), c) and d) described in the above paragraph. This statement applies to all cases in which the detailed explanations and preferences in connection with prepolymers comprising units of formula I can sensibly be applied to the process described in the above paragraph.

The decisive criteria determining the suitability of a prepolymer for use in the process according to the invention are that the prepolymer is soluble in water and that it comprises crosslinkable groups.

The preparation of a substantially aqueous solution of a water-soluble prepolymer that comprises crosslinkable groups can be carried out in a manner known per se, for example by synthesis of the prepolymer in a substantially aqueous solution or by isolation of the prepolymer for example in pure form, which means free from undesired constituents, and dissolution thereof in a substantially aqueous medium.

In accordance with the invention, the criterion that the prepolymer is soluble in water denotes in particular that the prepolymer is soluble in a concentration of approximately from 3 to 90% by weight, preferably approximately from 5 to 60% by weight, especially approximately from 10 to 60% by weight, in a substantially aqueous solution. Insofar as it is possible in an individual case, prepolymer concentrations of more than 90% are also included in accordance with the invention. Especially preferred concentrations of the prepolymer in solution are from approximately 15 to approximately 50% by weight, especially from approximately 15 to approximately 40% by weight, for example from approximately 25% to approximately 40% by weight.

Within the scope of this invention, substantially aqueous solutions of the prepolymer comprise especially solutions of the prepolymer in water, in aqueous salt solutions, especially in aqueous salt solutions that have an osmolarity of approximately from 200 to 450 milliosmol per 1000 ml (unit: mOsm/l), preferably an osmolarity of approximately from 250 to 350 mOsm/l, especially approximately 300 mOsm/l, or in mixtures of water or aqueous salt solutions with physiologically tolerable polar organic solvents, such as, for example, glycerol. Solutions of the prepolymer in water or in aqueous salt solutions are preferred.

The aqueous salt solutions are advantageously solutions of physiologically tolerable salts, such as buffer salts customary in the field of contact lens care, for example phosphate salts, or isotonising agents customary in the field of contact lens care, such as, especially, alkali halides, for example sodium chloride, or solutions of mixtures thereof. An example of an especially suitable salt solution is an artificial, preferably buffered, lacrimal fluid that in respect of pH value and osmolarity is adapted to natural lacrimal fluid, for example a sodium chloride solution that is unbuffered or that is preferably buffered, for example, by phosphate buffer, and that has an osmolarity that corresponds to the osmolarity of human lacrimal fluid.

The substantially aqueous solution of the prepolymer defined hereinbefore is preferably a pure solution which means a solution which is free or essentially free from undesired constituents. Especially preferred examples of such solutions are a solution of the prepolymer in pure water or in an artificial lacrimal fluid, as defined hereinbefore.

The viscosity of the solution of the prepolymer in the substantially aqueous solution is, within wide limits, not critical, but the solution should preferably be a flowable solution that can be deformed strain-free.

The molecular weight of the prepolymer is also, within wide limits, not critical. Preferably, however, the prepolymer has a molecular weight of from approximately 10 000 to approximately 200 000.

The prepolymer used in accordance with the invention must furthermore comprise crosslinkable groups. "Crosslinkable groups" denotes customary crosslinkable groups well-known to the person skilled in the art, such as, for example, photocrosslinkable or thermally crosslinkable groups. Crosslinkable groups such as those already proposed for the preparation of contact lens materials are especially suitable. Those include especially, but not exclusively, groups comprising carbon-carbon double bonds. To demonstrate the large variety of suitable crosslinkable groups, there are mentioned here, merely by way of example, the following crossing mechanisms: radical polymerisation, 2+2 cyclo-addition, Dieis-Alder reaction, ROMP (Ring Opening Metathesis Polymerisation), vulcanisation, cationic crosslinking and epoxy hardening.

Suitable water-soluble prepolymers that comprise crosslink able groups are, for example, compounds comprising units of formula I. It is also possible, however, to use in the process other water-soluble prepolymers that comprise a polymeric backbone and also crosslinkable groups.

Suitable polymeric backbones include, besides polyvinyl alcohol, materials such as those already proposed in some cases as contact lens materials, for example polymeric diols other than PVA, polymers comprising saccharides, polymers comprising vinylpyrrolidone, polymers comprising alkyl-(meth)acrylates, polymers comprising alkyl(meth)acrylates that have been substituted by hydrophilic groups, such as by hydroxy, carboxy or by amino, polyalkylene glycols, or copolymers or mixtures thereof.

The prepolymer used in accordance with the invention preferably comprises crosslinkable groups in an mount of from approximately 0.5 to approximately 80% equivalents, based on the equivalents of monomers that form the polymeric backbone, especially approximately from 1 to 50%, preferably approximately from 1 to 25%, preferably approximately from 2 to 15% and especially preferably approximately from 3 to 10%. Also especially preferred are amounts of crosslinkable groups of from approximately 0.5 to approximately 25% equivalents, especially approximately from 1 to 15% and especially preferably approximately from 2 to 12%, based on the equivalents of monomers that form the polymeric backbone.

As already mentioned, an essential criterion for the suitability of a prepolymer for the process according to the invention is that it is a crosslinkable prepolymer, but the prepolymer is uncrosslinked, or at least substantially uncrosslinked, so that it is water-soluble.

In addition, the prepolymer is advantageously stable in the uncrosslinked state, so that it can be subjected to purification as described hereinbefore in connection with compounds comprising units of formula I. The prepolymers are preferably used in form of a pure solution in the process according to the invention. The prepolymers can be converted into the form of a pure solution for example in the manner disclosed hereinafter.

Preferably, the prepolymers used in the process according to the invention can be purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents.

The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the sodium chloride content of the solution, which can be determined simply in known manner.

In a preferred embodiment of the process according to the invention there is prepared in step a) and further used in the process a substantially aqueous solution of the prepolymer that is substantially free from undesired constituents, such as, for example, free from monomeric, oligomeric or polymeric starting compounds used for the preparation of the prepolymer, and/or free from secondary products formed during the preparation of the prepolymer. The substantially aqueous solution is more preferably a pure aqueous solution or a solution in an artificial lacrimal fluid, as defined hereinbefore. It is also preferable to carry out the process according to the invention without the addition of a comonomer, for example a vinylic comonomer.

On the basis of one of the measures mentioned in the above paragraph, and especially on the basis of a combination of the measures mentioned in the above paragraph, the solution of the prepolymer used in the process according to the invention is one that comprises no, or substantially no, undesired constituents that would have to be extracted after a crosslinking operation. A particular feature of this preferred embodiment of the process according to the invention is therefore that the extraction of undesired constituents following crosslinking can be dispensed with.

The process according to the invention is therefore preferably carried out in such a manner that the substantially aqueous solution of the water-soluble prepolymer comprising crosslinkable groups is free or substantially free of undesired constituents, such as especially monomeric, oligomeric or polymeric starting compounds used for the preparation of the prepolymer, or secondary products that have formed during the preparation of the prepolymer, and/or that the solution is used without the addition of a comonomer, so that the extraction of any undesired constituents in the further course of the process can be dispensed with.

One additive that is added, where appropriate, to the solution of the prepolymer is an initiator for the crosslinking, should an initiator be required for crosslinking the crosslinkable groups. That may be the case especially if the crosslinking is carried out by photocrosslinking, which is preferred in the process according to the invention.

In the case of photocrosslinking, it is appropriate to add a photoinitiator which can initiate radical crosslinking. Examples thereof are familiar to the person skilled in the art and suitable photoinitiators that may be mentioned specifically are benzoin methyl ether, 1-hydroxycyclohexylphenyl ketone, or a commercial product such as Darocure- or Irgacure types, e.g. Darocure 1173 or Irgacure 2959.

Methods that are known per se, such as, especially, conventional metering in, for example by dropwise introduction, may be used to introduce the resulting solution into a mould. Suitable moulds are generally customary contact lens moulds as known in the state of the art. Thus, the contact lenses according to the invention can be manufactured, for example, in a manner known per se, for example in a conventional "spin-casting mould", as described, for example, in U.S. Pat. No. 3,408,429, or by the so-called Full-Mould process in a static mould, as described, for example, in U.S. Pat. No. 4,347,198. Appropriate moulds are made, for example, from polypropylene. Quartz, sapphire glass and metals, for example, are suitable materials for re-usable moulds.

The crosslinking can be triggered in the mould, for example by actinic radiation, such as, for example, UV light, or by ionising radiation, such as, for example, gamma radiation, electron radiation or X radiation. The crosslinking can where appropriate also be triggered thermally. Attention is drawn to the fact that the crosslinking can be carried out according to the invention in a very short time, for example in less than five minutes, preferably in less than one minute, especially in up to 30 seconds, especially preferably, as disclosed in the examples.

The opening of the mould such that the moulding can be removed from the mould can be carried out in a manner known per se. Whereas in processes that have been proposed in the state of the art it is usually necessary at that point for purification steps to follow, for example extraction, and also steps for the hydration of the resulting mouldings, especially contact lenses, such steps are not necessary in the process according to the invention.

Since the solution of the prepolymer preferably does not comprise any undesired low-molecular constituents, the crosslinked product, too, does not comprise any such constituents. Therefore subsequent extraction is not necessary. Since the crossing is carried out in a substantially aqueous solution, subsequent hydration is not necessary. Those two advantages mean, inter alia, that a complicated after-treatment of the resulting mouldings, especially contact lenses, is dispensed with. The contact lenses obtainable in accordance with the process according to the invention are therefore, according to an advantageous embodiment, distinguished by the fact that they are suitable for their intended use without extraction. "Intended use" in this context means especially that the contact lenses can be used in the human eye. The contact lenses obtainable in accordance with the process according to the invention are, according to an advantageous embodiment, also distinguished by the fact that they are suitable for their intended use without hydration.

The process according to the invention is therefore outstandingly well suited to the economical manufacture of a large number of mouldings, such as contact lenses, in a short time. The contact lenses obtainable in accordance with the process according to the invention have inter alia the advantages over the contact lenses known from the state of the art that they can be used for their intended use without subsequent treatment steps, such as extraction or hydration.

In the following Examples, unless expressly stated otherwise amounts are amounts by weight, and temperatures are in degrees Celsius. The Examples are not intended to limit the invention in any way, for instance to the scope of the Examples.

EXAMPLE 1a)

Over a period of 4 hours, 104.5 parts of methacryloyl chloride dissolved in 105 parts of dichloromethane are added dropwise at a maximum of 15° C., while cooling with ice, to 105.14 parts of aminoacetaldehyde dimethylacetal and 101.2 parts of triethylamine in 200 parts of dichloromethane. When the reaction is complete, the dichloromethane phase is washed with 200 parts of water then with 200 parts of 1N HCl solution, and then twice with 200 parts of water. After drying with anhydrous magnesium sulfate, the dichloromethane phase is concentrated by evaporation and stabilised with 0.1% of 2,6-di-tert-butyl-p-cresol, based on the reaction product. After distillation at 90° C. $10^{-3}$ mbar, 112 g of methacrylamidoacetaldehyde dimethylacetal are obtained in the form of a colourless liquid, boiling point 92° C. $10^{-3}$ mbar (65% yield).

EXAMPLE 1b)

52.6 g of aminoacetaldehyde dimethylacetal are dissolved in 150 ml of deionised water and cooled to 5° C. with ice. Subsequently, 50 ml of methacrylic acid chloride and 50 ml of 30% sodium hydroxide solution are simultaneously so added over a period of 40 minutes that the pH value remains at 10 and the temperature does not exceed 20° C. When the addition is complete, the remaining content of aminoacetaldehyde dimethylacetal is determined as 0.18% by gas chromatography. The amine is reacted fully by the further addition of 2.2 ml of methacrylic acid chloride and 2.0 ml of 30% sodium hydroxide solution. The solution is then neutralised with 1N hydrochloric acid (pH=7). The aqueous phase is extracted with 50 ml of petroleum ether and washed with water. The petroleum ether phase contains 3.4 g of secondary product. The aqueous phases are combined and yield 402.8 g of a 20.6% solution of methacrylamidoacetaldehyde dimethylacetal. According to a gas chromatogram, the product is 98.2%.

EXAMPLE 2

10 parts of polyvinyl alcohol having a molecular weight of 22 000 and a degree of hydrolysis of 97.5–99.5% are dissolved in 90 parts of water, 2.5 parts of methacrylamidoacetaldehyde dimethylacetal are added and the mixture is acidified with 10 parts of concentrated hydrochloric acid. The solution is stabilised with 0.02 parts of 2,6-di-tert-butyl-p-cresol. After stirring for 20 hours at room temperature, the solution is adjusted to pH 7 with 10% sodium hydroxide solution and then ultrafiltered seven times using a 3 kD membrane (ratio 1:3). After concentration, an 18.8% aqueous solution of methacrylamidoacetaldehydo- 1,3-acetal of polyvinyl alcohol having a viscosity of 2240 cP at 25° C. is obtained.

EXAMPLE 3

10 parts of the solution of methacrylamidoacetaldehydo-1,3-acetal of polyvinyl alcohol obtained in accordance with Example 2 are photochemically crosslinked by adding 0.034 parts of Darocure 1173 (CIBA-GEIGY) thereto. The mixture is irradiated in the form of a 100 micron thick layer between two glass plates with 200 pulses of a 5000 watt irradiation device produced by Staub. A solid transparent film with a solids content of 31% is obtained.

EXAMPLE 4

110 g of polyvinyl alcohol (Moviol 4–88, Hoechst) are dissolved at 90° C. in 440 g of deionised water and cooled to 22° C. 100.15 g of a 20.6% aqueous solution of methacrylamidoacetaldehyde dimethylacetal, 38.5 g of concentrated hydrochloric acid (37% p.a., Merck) and 44.7 g of deionised water are added thereto. The mixture is stirred at room temperature for 22 hours and then adjusted to pH 7.0 with a 5% NaOH solution. The solution is diluted to 3 litres with deionised water, filtered and ultrafiltered using a 1-KD-Omega membrane produced by Filtron. After the three-fold specimen volume has permeated, the solution is concentrated. 660 g of a 17.9% solution of the methacrylamido-acetaldehydo-1,3-acetal of polyvinyl alcohol having a viscosity of 210 cp are obtained The inherent viscosity of the polymer is 0.319. The nitrogen content is 0.96%. According to NMR investigation, 11 mol % of the OH groups have been acetalised and 5 mol % of the OH groups acetylated. Concentration of the aqueous polymer solution under reduced pressure and with air draft yields a 30.8% solution having a viscosity of 3699 cp.

EXAMPLE 5

66.6 g of deionised water, 3.3 g of monomeric 4-methacrylamidobutyr-aldehyde diethylacetal and 20.0 g of concentrated hydrochloric acid (37% p.a., Merck) are added to 133.3 g of a 15% polyvinyl alcohol solution (Moviol 4–88, Hoechst) and the mixture is stirred at room temperature for 8 hours. The solution is then adjusted to pH 7 with 5% sodium hydroxide solution. After ultrafiltration of the solution using a 3-KD-Omega membrane produced by Filtron, the sodium chloride content of the polymer solution being reduced from 2.07% to 0.04%, a 20% polymer solution of the methacryl-amidobutyraldehydo-1,3-acetal of polyvinyl alcohol having a viscosity of 400 cp is obtained. The inherent viscosity of the polymer is 0.332. The nitrogen content is 0.41%. According to NMR investigation, 7.5 mol % of the OH groups are charged with acetal groups and 7.3 mol % of the OH groups are charged with acetate groups.

EXAMPLE 6

2.4 g (14.8 mmol) of aminobutyraldehyde diethylacetal (Fluka) and 20 g of concentrated hydrochloric acid (37% p.a., Merck) are added to 200 g of a 10% polyvinyl alcohol solution (Moviol 4–88, Hoechst). The solution is stirred at room temperature for 48 hours and then neutralised with 10% sodium hydroxide solution. The solution is diluted to 400 ml. 200 ml of the solution are further processed in accordance with Example 7. 0.85 g (8.1 mmol) of methacrylic acid chloride (Fluka) is added to the remaining 200 ml of the solution and the pH value is maintained at 10 with 2N sodium hydroxide solution. After 30 minutes at room temperature, the pH is adjusted to 7.0 and the solution is purified analogously to Example 5 using a 3-KD-Omega membrane produced by Filtron. Concentration yields a 27.6% polymer solution of the methacryl-amidobutyraldehydo-1,3-acetal of polyvinyl alcohol having a viscosity of 2920 cp. The inherent viscosity of the polymer is 0.435. The nitrogen content is 0.59%.

EXAMPLE 7

1.3 g (8.5 mmol) of 2-isocyanatoethyl methacrylate are added to 200 ml of the polymer solution of Example 6 and the pH maintained at 10 with 2N sodium hydroxide solution. After 15 minutes at room temperature the solution is neutralised with 2N hydrochloric acid and ultrafiltered analogously to Example 6. Concentration yields a 27.1% polymer solution of the 4-(2-methacryloylethyl-ureido)butyraldehydo-1,3-acetal of polyvinyl alcohol having a viscosity of 2320 cp. The inherent viscosity of the polymer is 0.390. The nitrogen content is 1.9%.

EXAMPLE 8

0.7% Darocure 1173 (based on the content of polymer) is added to the 30.8% polymer solution according to Example 4 having a viscosity of approximately 3600 cp. The solution is introduced into a transparent contact lens mould of polypropylene and the mould is closed. The solution is irradiated for 6 seconds from a distance of 18 cm using a 200 watt Oriel UV lamp. The mould is opened and the finished contact lens can be removed. The contact lens is transparent and has a water content of 61%. The modulus is 0.9 mPa, the flexural elongation 50%. The contact lens is autoclaved for 40 minutes at 121° C. No changes in shape can be detected in a contact lens treated in that manner.

EXAMPLE 9

0.0268 g of Darocure 1173 (0.7% based on the polymer content) and 0.922 g of methyl methacrylate are added to 10.00 g of a 27.1% polymer solution according to Example 7. After the addition of 2.3 g of methanol a clear solution is obtained. That solution is irradiated for a period of 14 seconds analogously to Example 8, using a 200 watt Oriel lamp. A transparent contact lens having a water content of 70.4% is obtained.

EXAMPLE 10

1.04 g of acrylamide and 0.03 g of Darocure 1173 are added to 12.82 g of a 24.16% solution of the prepolymer of Example 4. The clear solution is then irradiated for 14 seconds analogously to Example 8, using a 200 watt Oriel lamp. A contact lens having a water content of 64.4% is obtained.

EXAMPLE 11

220 g (5.5 mol) of sodium hydroxide are dissolved in 300 g of water and 700 g of ice in a 3-litre reactor having a stirrer and a cooling system. The sodium hydroxide solution is cooled to 10° C. and 526 g (5.0 mol) of aminoacetaldehyde dimethylacetal and 50 mg of 4-hydroxy-2,2,6,6-tetramethylpiperidin-1-oxide (radical inhibitor) are added. 548.6 g (5.5 mol) of methacrylic acid chloride are slowly added at 10° C. to the solution over a period of 3.5 hours. When the addition is complete, the pH value drops slowly to 7.2 and amine can no longer be detected by GC. The reaction mixture is extracted with 500 ml of petroleum ether, and in order to remove impurities, the aqueous phase is saturated with sodium chloride and extracted three times with 500 ml of tert-butyl methyl ether. The organic phase is dried with magnesium sulfate, filtered and concentrated using a rotary evaporator. The resulting 882.2 g of yellowish oil are slowly stirred into 2000 ml of petroleum ether at −10° C. by means of an Ultraturax. The product crystallises, and is isolated by filtration and dried. 713.8 g of methacrylamidoacetaldehyde dimethylacetal (86% of theory), melting point 30–32° C., are obtained; the product is 99.7% according to GC.

EXAMPLE 12

40 g (1.0 mol) of sodium hydroxide are dissolved in 100 g of water and 200 g of ice in a 1-litre reactor having a stirrer and a cooling system. The sodium hydroxide solution is cooled to 10° C., and 105.1 g (1.0 mol) of aminoacetaldehyde dimethylacetal and 10 mg of the inhibitor 4-hydroxy-2,2,6,6-tetramethylpiperidin-1-oxide are added. 99.5 g (1.1 mol) of acrylic acid chloride are slowly added to that solution at 10° C. over a period of 2 hours. The pH value drops slowly and ultimately is adjusted to 7. According to GC, amine is no longer present. The reaction mixture is saturated with sodium chloride and extracted three times with 200 ml of tert-butyl methyl ether. The organic phase is dried, filtered and concentrated using a rotary evaporator. The resulting oil is extracted three times with petroleum ether and then dried again using a rotary evaporator. 130 g of acrylamidoacetaldehyde dimethylacetal (81% of theory) are obtained in the form of an oil; the product is 99% according to GC.

EXAMPLE 13

General preparative method for the reaction of PVA with acetals or aldehydes for the preparation of reaction products having a high acetate content 300 g of PVA (for example Moviol Hoechst 4–88) are placed in a 2-litre double-jacket reactor having a stirrer and thermometer, 800 g of deionised water are added, and the mixture is heated to 95° C. with stirring. After one hour, everything has dissolved to produce a clear solution which is cooled to 20° C. 27 g (0.155 mol) of methacrylamidoacetaldehyde dimethyl acetal (from Example 11), 440 g of acetic acid, 100 g of concentrated hydrochloric acid (37%) and sufficient deionised water (in this specific case: 333 g) are added to produce a total of 2000 g of reaction solution. The mixture is stirred for 20 hours at 20° C. The change in the acetate content can be ascertained by titration of the acetic acid.

Isolation can be carried out by means of ultrafiltration: the reaction mixture is cooled to 15° C. and adjusted to pH 3.6 with aqueous NaOH (5%). The polymer solution is filtered by way of a 0.45 μm filter and purified by means of ultrafiltration. The ultrafiltration is carried out using a 1-KD-Omega membrane produced by Filtron. Ultrafiltration is carried out to a residual sodium chloride content of 0.004%. Before the purification is complete, the solution is adjusted to pH 7 with 0.1N sodium hydroxide solution. Concentration yields 1995 g of a 14.54% polymer solution (92% of theory); N-content (Kjendahl determination)=0.683%, acetate content (ascertained by hydrolysis)=2.34 meq/g, inherent viscosity: 0.310, double bonds: 0.5 meq/g (ascertained by microhydrogenation), free hydroxy groups (ascertained by reacetylation): 15.3 meq/g, GPC analysis (in water): Mw=19 101, Mn=7 522, Mw/Mn=2.54.

The isolation can also be carried out by means of precipitation: the reaction mixture is adjusted to pH 3.6 with triethylamine and precipitated in acetone in a ratio of 1:10. The precipitate is separated off, dispersed twice with ethanol and once with acetone, and dried. The product so obtained has the same properties as the product obtained by ultrafiltration.

EXAMPLE 14

General preparative method for the reaction of PVA with acetals or aldehydes for the preparation of reaction products having a low acetate content.

300 g of PVA (for example Moviol Hoechst 4–88) are placed in a 2-litre double-jacket reactor having a stirrer and thermometer, 800 g of deionised water are added and the mixture is heated to 95° C. with stirring. After one hour, everything has dissolved to produce a clear solution which is cooled to 20° C. 27 g (0.155 mol) of methacrylamidoacetaldehyde dimethyl acetal (from Example 11), 200 g of concentrated hydrochloric acid (37%) and sufficient deionised water (in this specific case: 673 g) are added to produce a total of 2000 g of reaction solution. The mixture is stirred at 20° C. After 20 hours, a sample of the reaction solution is titrated with sodium hydroxide and the degree of hydrolysis of the PVA is ascertained: HCl=1.034 meq/g, acetic acid= 0.265 meq/g corresponding to 3.5 mol % residual acetate. The reaction mixture is stirred for a further 2 hours at 25° C. and titrated again. HCl=1.034 meq/g, acetic acid=0.277 meq/g, corresponding to 2.93 mol % residual acetate.

The isolation can be carried out by means of ultrafiltration: the reaction mixture is cooled to 15° C. and adjusted to pH 7 with aqueous NaOH (5%). The polymer solution is filtered by way of a 0.45 μm filter and purified by means of ultrafiltration. The ultrafiltration is carried out using a 1-KD-Omega membrane produced by Filtron. Ultrafiltration is carried out to a residual sodium chloride content of 0.002%. 1800 g of a 14.02% polymer solution (86% of theory) are obtained; N-content (Kjendahl determination)=0.741%, acetate content (after titration)=0.605 meq/g corresponding to 2.91 mol %, inherent viscosity: 0.327, double bonds: 0.61 meq/g (ascertained by microhydrogenation), free hydroxy groups (ascertained by reacetylation): 18.13 meq/g, GPC analysis (in water): Mw=22 007, Mn=9 743, Mw/Mn=2.26.

The isolation can also be carried out by means of precipitation: the reaction mixture is adjusted to pH 3.6 with triethylamine and precipitated in acetone in a ratio of 1:10. The precipitate is separated off, dispersed twice with ethanol and once with acetone, and dried. The product so obtained is comparable with that obtained by ultrafiltration.

EXAMPLE 15

Manufacture of Contact Lenses 0.3% (based on polymer content) of the photoinitiator Irgacure 2959 is added to a 30% solution of the polymers listed below. The solutions are irradiated for 6 seconds in a transparent contact lens mould of polypropylene using a 200 W Oriel UV lamp (150 mW/cm$^2$). The lenses are removed from the mould. They are transparent and have the properties listed below.

Examples 15a) to 15j) reaction products of PVA (4–88) Moviol Hoechst, 12 tool % residual acetate, Mw=19 115, Mn=7887, Mw/Mn=2.43, inherent viscosity=0.358, in accordance with the preparative method of Example 13 or 14, isolation by ultrafiltration:

15a) 30 g of acetal from Example 11, preparative method according to Example 13, acetic acid addition: 700 g, inherent viscosity: 0.278,

| prepolymer data (sol): | N content: 1.34%,<br>acetal content: 0.96 meq/g,<br>acetate content: 19 mol %,<br>Mw: 17412, Mn: 6273, Mw/Mn: 2.77, |
|---|---|
| solids content: | 30% in the sol state results in 38.4%<br>in the gel state. |

15b): 24 g of acetal from Example 11, preparative method according to Example 13, acetic acid addition: 300 g, inherent viscosity: 0.329,

| prepolymer data (sol): | N content: 0.64%,<br>acetal content: 0.45 meq/g,<br>acetate content: 9 mol %, |
|---|---|
| solids content: | 30% in the sol state results in 29.5%<br>in the gel state. |

15c): 24 g of acetal from Example 11, preparative method according to Example 13, acetic acid addition: 700 g, inherent viscosity: 0.331,

| prepolymer data (sol): | N content: 0.58%,<br>acetal content: 0.42 meq/g,<br>acetate content: 17.5 mol %,<br>Mw: 18861, Mn: 8051, Mw/Mn: 2.34, |
|---|---|
| solids content: | 30% in the sol state results in 27.6%<br>in the gel state. |

15d): 30 g of acetal from Example 11, preparative method according to Example 13, acetic acid addition: 500 g, inherent viscosity: 0.327,

| prepolymer data (sol): | N content: 0.753%<br>acetal content: 0.54 meq/g,<br>acetate content: 12.5 mol %,<br>Mw: 19463, Mn: 8064, Mw/Mn: 2.41, |
|---|---|
| solids content: | 30% in the sol state results in 30.0%<br>in the gel state. |

15e): 56 g of acetal from Example 11, preparative method according to Example 13, acetic acid addition: 1000 g,

| prepolymer data (sol): | N content: 1.208%,<br>acetal content: 0.86 meq/g,<br>acetate content: 26 mol %, |
|---|---|
| solids content: | 30% in the sol state results in 36.7%<br>in the gel state. |

15f): 24 g of acetal from Example 11, preparative method according to Example 14, no acetic acid addition, inherent viscosity: 0.321,

| prepolymer data (sol): | N content: 0.659%,<br>acetal content: 0.46 meq/g,<br>acetate content: 5.9 mol %,<br>Mw: 27121, Mn: 6490, Mw/Mn: 4.18, |
|---|---|
| solids content: | 30% in the sol state results in 30.0%<br>in the gel state. |

15g): 48 g of acetal from Example 11, preparative method according to Example 14, no acetic acid addition,

| prepolymer data (sol): | N content: 1.23%,<br>acetal content: 0.88 meq/g,<br>acetate content: 6.6 mol %, |
|---|---|

| | Mw: 18833, Mn: 7047, Mw/Mn: 2.66, |
|---|---|
| solids content: | 30% in the sol state results in 36.7%<br>in the gel state. |

15h): 27 g of acetal from Example 11, preparative method according to Example 14, no acetic acid addition, inherent viscosity: 0.31,

| prepolymer data (sol): | N content 0.638%,<br>acetal content: 0.53 meq/g,<br>acetate content: 2.9 mol %,<br>Mw: 19101, Mn: 7522, Mw/Mn: 2.54, |
|---|---|
| solids content: | 30% in the sol state results in 30.0%<br>in the gel state. |

15i): 31 g of acetal from Example 12, preparative method according to Example 14, no acetic acid addition,

| prepolymer data (sol): | N content: 1.41%,<br>acetal content: 1.00 meq/g,<br>acetate content: 6.2 mol %, |
|---|---|
| solids content: | 30% in the sol state results in 37.0%<br>in the gel state. |

15j): 23 g of acetal from Example 12, preparative method according to Example 14, no acetic acid addition, inherent viscosity: 0.352,

| prepolymer data (sol): | N content: 0.62%,<br>acetal content: 0.44 meq/g,<br>acetate content: 5.8 mol %. |
|---|---|

Examples 15k) to 15l): Reaction products of PVA (8–88) Moviol Hoechst, 12 mol % residual acetate, Mw=49 000, Mn=19 600, Mw/Mn=2.5, inherent viscosity= 0.546, according to the preparative method of Example 13, isolation by ultrafiltration:

15k): 53 g of acetal from Example 11, acetic acid addition: 400 g,

| prepolymer data (sol): | N content: 1.31%,<br>acetal content: 0.94 meq/g,<br>acetate content: 8.9 mol %, |
|---|---|

15l) 30 g of acetal from Example 11, acetic acid addition: 490 g, inherent viscosity: 0.495,

| prepolymer data (sol): | N content: 0.747%,<br>acetal content: 0.54 meq/g,<br>acetate content: 13.6 mol %,<br>Mw: 44334, Mn: 17293, Mw/Mn: 2.56, |
|---|---|
| solids content: | 30% in the sol state results in 30.5%<br>in the gel state. |

What is claimed is:

1. A prepolymer which is a derivative of a polyvinyl alcohol having a weight average molecular weight of at least about 2000 that, based on the number of hydroxy groups of the polyvinyl alcohol, comprises from approximately 0.5 to approximately 80% of units of formula I

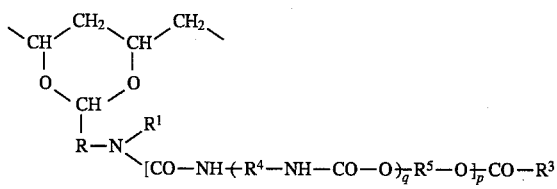

eherein

R is lower alkylene having up to 8 carbon atoms, $R^1$ is hydrogen or lower alkyl, p is zero or one, q is zero or one, $R^3$ is an olefinically unsaturated copolymerisable radical having from about 2 to 8 carbon atoms, and $R^4$ and $R^5$ are each independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylenearylene having from 13 to 16 carbon atoms.

2. A prepolymer according to claim 1, wherein R is lower alkylene having up to 6 carbon atoms, p is zero and $R^3$ is alkenyl having from 2 to 8 carbon atoms.

3. A prepolymer according to claim 1, wherein R is lower alkylene having up to 6 carbon atoms, p is one, q is zero, $R^5$ is lower alkylene having from 2 to 6 carbon atoms and $R^3$ is alkenyl having from 2 to 8 carbon atoms.

4. A prepolymer according to claim 1, wherein R is lower alkylene having up to 6 carbon atoms, p is one, q is one, $R^4$ is lower alkylene having from 2 to 6 carbon atoms, phenylene, unsubstituted or substituted by lower alkyl, cyclohexylene or cyclohexylene-lower alkylene, unsubstituted or substituted by lower alkyl, phenylene-lower alkylene, lower alkylene-phenylene or phenylene-lower alkylene-phenylene, $R^5$ is lower alkylene having from 2 to 6 carbon atoms and $R^3$ is alkenyl having from 2 to 8 carbon atoms.

5. A prepolymer according to claim 1, which is a derivative of a polyvinyl alcohol having a weightavarage molecular weight of at least about 2000 that, based on the number of hydroxy groups of the polyvinyl alcohol, comprises from approximately 1 to approximately 15% of units of formula I.

6. A polymer, obtainable by photocrosslinking a prepolymer according to claim 1 in the absence or presence of an additional vinylic comonomer.

7. A polymer according to claim 6, obtained by photocrosslinking a prepolymer according to claim 18 in a substantially pure form, which form is substantially free from reaction products and starting materials, in the absence or presence of an additional vinylic comonomer.

8. A polymer according to claim 7, wherein the polymer is converted into substantially pure form by from one to ten ultrafiltrations.

9. A polymer according to claim 6, obtainable by photocrosslinking a prepolymer according to claim 1 in the absence of an additional vinylic comonomer.

10. A polymer according to claim 6, obtainable by photocrosslinking a prepolymer according to claim 18 in the presence of from 0.5 to 80 units of an additional vinylic comonomer per unit of formula I.

11. A process for the preparation of a polymer according to claim 6, which comprises photocrosslinking a prepolymer according to claim 1 in the absence or presence of an additional vinylic comonomer.

12. A process according to claim 11, wherein the prepolymer is used in substantially pure form, which form is substantially free from reaction products and starting materials.

13. A process according to claim 12, wherein the per polymer is converted into a substantially pure form by from one to ten ultrafiltrations.

14. A process according to claim 11, which is carried out in solution.

15. A moulding consisting substantially of a polymer according to claim 6.

16. A moulding according to claim 15, which is a contact lens.

17. A process for the manufacture of a moulding according to claim 15, which comprises photocrosslinking a prepolymer according to claim 1, in the absence or presence of an additional vinylic comonomer, in a closed mould.

18. A process for the manufacture of a contact lens according to claim 16, which comprises photocrosslinking a prepolymer according to claim 1, in the absence or presence of an additional vinylic comonomer, in a closed contact lens mould in the Full-Mould process.

19. A polymer according to claim 10, obtained by photocrosslinking a prepolymer according to claim 18 in the presence of from 1 to 30 units of vinylic comonomer per unit of formula I.

20. A polymer according to claim 19, obtained by photocrosslinking a prepolymer according to claim 18 in the presence of from 5 to 20 units of vinylic comonomer per unit of formula I.

21. A process of claim 14, wherein said solution is an aqueous solution.

* * * * *